Jan. 28, 1958     D. G. HALL     2,821,228
PROTECTIVE APPARATUS FOR GRINDING MACHINES
Filed Dec. 9, 1955
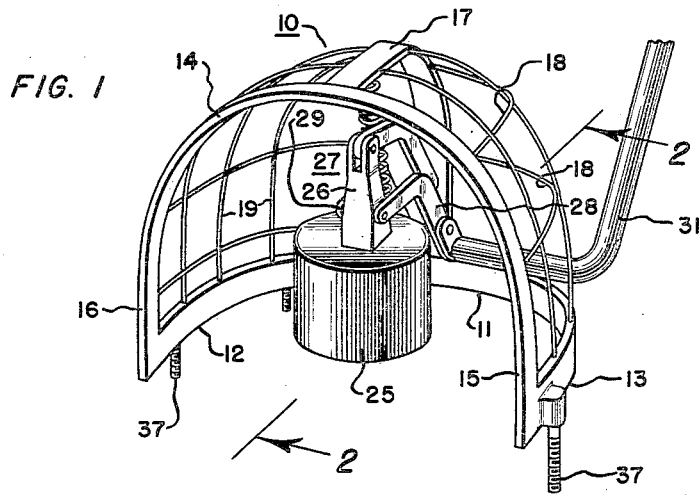
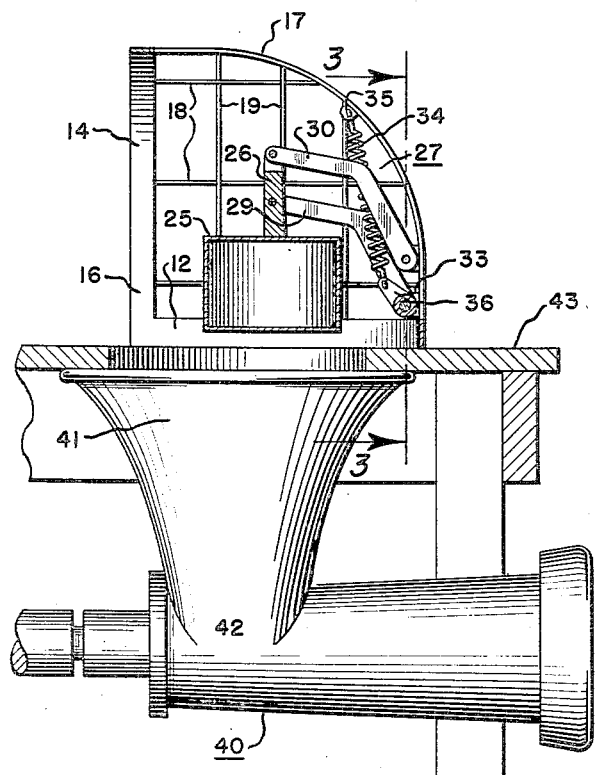
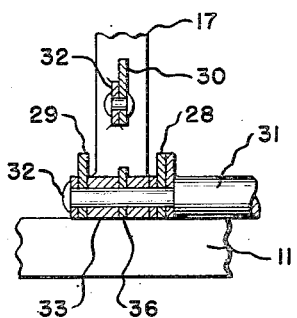
INVENTOR.
DAVID G. HALL
BY
ATTORNEY United States Patent Office 2,821,228
Patented Jan. 28, 1958

2,821,228

PROTECTIVE APPARATUS FOR GRINDING MACHINES

David G. Hall, San Diego, Calif.

Application December 9, 1955, Serial No. 552,056

7 Claims. (Cl. 146—182)

This invention relates generally to shredding or grinding machines and more particularly to protective apparatus for feeding shredding or grinding machines.

Heretofore, it has been common practice in shredding or grinding meat, for example, to place the meat to be ground into the bowl portion of the grinder. With the grinding or shredding gear turning, the operator then manually forces the meat into the grinding gear; generally with a wooden or plastic plunger. However, it has been found in many instances, for one reason or another, an operator does not use a mallet or plunger but actually presses the meat by hand into the grinding gear. This latter technique is obviously hazardous regardless of the degree of care or caution exhibited by the operator. On the other hand, where the conventional plunger is used to force the meat into the shredding gear, the plunger oftentimes comes in contact with the gear, with the result that portions of the plunger are shredded off and mixed with the meat. Furthermore, the normal operation of grinding or shredding machines that are designed in such a way that the meat must be forced into the gears either by hand or by a hand operated plunger or mallet are unsafe. Moreover, if the machines are so designed, it has been found that people accidentally get their hands into the gears even though they are not intentionally operating the machine.

It is, therefore, an object of the present invention to provide apparatus for grinding machines which allows an operator to safely feed the substance to be ground to the grinding portion of the machine.

Another object of the present invention is to provide functional protective apparatus over the bowl and grinding portions of a grinding machine.

Another object of the present invention is to provide a mechanical plunger assembly and shield that may be removed from the grinding machine as a unit and cleaned.

Another object of the present invention is to provide a plunger assembly that serves to force the substance to be ground into the grinding portion of the machine but precludes contact between the plunger and grinding gear.

Another object of the present invention is to provide economical safety apparatus for a grinding machine that also serves to increase the productivity of the machine.

Other objects and features of the present invention will be readily apparent to those skilled in the art from the following specification and appended drawings wherein is illustrated a preferred form of the invention, and in which:

Figure 1 is a perspective view of an embodiment of the present invention showing a shield, plunger and plunger actuating mechanism, and Figure 2 is a sectional view of the shield and plunger taken through 2—2 of Figure 1 together with a side view of a typical grinding machine, and Figure 3 is a sectional view of the plunger actuating mechanism and portion of the shield taken at 3—3 in Figure 2.

The present invention has found particular utility with conventional rotary grinding or shredding machines and especially with commercial rotary type meat grinders. These grinders have a bowl portion into which the substance to be ground is fed to the grinding portion of the machine. In accordance with the concepts of the present invention, a shield is provided to cover the bowl portion of the machine. The shield is open on one end and is so constructed as to prevent the operator's hands from reaching the grinding portion of the machine, either while operating the machine or not. A plunger or ram, which serves to force the substance to be ground into the grinding portion of the machine, is supported within the shield and above the bowl portion of the machine. Interconnected with the plunger is an actuating mechanism which serves to support, direct, and force the plunger toward the grinding portion of the machine; and which may be carried by the shield to thereby allow the apparatus to be removed as a unit from the grinding machine and cleaned.

Referring now to the drawings, there is shown in Figure 1 a shield generally denoted by reference numeral 10. Shield 10 includes a frame comprising a generally U-shaped member 11, and although the material of member 11 forms no part of the present invention, it is preferably fabricated of stainless steel or other corrosion resistant metal. Chromium plated material has been found to be generally unsatisfactory in this application due to the possibility of the plating peeling off. The separation between legs 12 and 13 of member 11 is at least equal to the diameter of the bowl portion of the grinding machine with which the apparatus is to be used. The frame may also include a member 14, which may be of similar shape and material as member 11. As illustrated, member 14 should be of sufficient depth to provide an adequate opening through which the substance to be ground can be fed to the bowl portion of the machine and should also provide adequate space for the plunger assembly when it is in its static or raised position. It will be readily apparent that frame members 11 and 14 may be fabricated as a single unit, however, in this embodiment legs 15 and 16 are angularly attached to legs 12 and 13 of member 11 by any suitable means, such as welding, brazing, or the like. In Figures 1 and 2 it will be noted that members 11 and 14 are shown as being perpendicular, but it should be understood that the fixed angular relationship of frame members 11 and 14 may be varied to provide either more or less shielding. The frame may also include a connecting member 17 interposed between members 11 and 14 to provide rigidity for the frame and support for enclosing the frame to prevent access to the grinding gears of the machine.

Means for enclosing the frame is illustrated in the drawings in the form of horizontal steel bars 18 attached to the frame member 14 and connecting member 17 together with vertical bars 19 attached to the frame member 11 and member 17. It is contemplated that rods 18 and 19 should be so spaced as to allow access to the plunger and other elements within the shield for the removal of any material that may collect there, but, on the other hand, to preclude the operator from reaching through the shield and into the grinding portion of the machine. Thus, it may be seen that with bars 18 and 19 attached to frame members 11 and 14 and connecting member 17 a dome-shaped shield is provided with an opening therein through which the substance to be ground may be conveyed to the bowl portion of the grinding machine.

In the foregoing description, shield 10 is described as being fabricated of frame members 11 and 14, conecting member 17, and bars 18 and 19 all of which are attached together to provide the shield. However, it should be understood that the present invention is not so limited;

it is considered merely a matter of choice and design as to whether the shield should be fabricated of separate parts attached together or whether it should be cast, molded, or formed as a single unit.

As illustrated in Figures 1 and 2, a plunger 25, having a supporting member 26, is positioned within protective shield 10 and serves to force the material to be ground into the grinding portion of the machine. Plunger 25 has a shape and size such as to allow it to move within the bowl portion and into the throat of the grinding machine. In this embodiment of the present invention plunger 25 is in the form of a cylinder, the diameter of which is slightly larger than the smallest internal diameter of the throat of the machine. Thus, plunger 25 is prevented from contacting the grinding gear of the machine. However, contact between plunger 25 and the grinding gear may be prevented by other means, to be described hereinafter, and the diameter of plunger 25 may then be made equal to or less than the internal diameter of the throat of the machine.

Actuating means, denoted generally by reference numeral 27, serves to support, direct and move plunger 25 within the bowl portion of the machine to thereby force the material to be ground into the grinding gear. Actuating means 27 includes lever arms 28, 29, and 30 and a manually operable actuating member 31. As shown in Figure 3, driving levers 28 and 29 and actuating handle 31 are fixedly attached together and the entire assembly is mounted to the shield 10 by suitable means, such as by bolt or screw 32 and bracket 33, which is secured to the shield frame. The other end of levers 28 and 29 are pivotably attached to opposite sides of support member 26 associated with the plunger. It will be apparent to one skilled in the art that driving levers 28 and 29 may be in the form of a single lever operatively connected at one end to actuating handle 31 and having a forked portion on the other end for pivotable attachment to the sides of the plunger supporting member 26. Lever arm 30 may be of a shape generally similar to that of arms 28 and 29; and, as shown, may be pivotably supported at one end to a bracket 32 carried by the frame of shield 10. Lever 30 is pivotably supported at its other end to the clevis end of plunger support member 26.

Levers 28, 29, and 30 and member 26 serve to support plunger 25 while it is in its raised or static condition, and the length and configuration of the levers is arranged to direct and to force the plunger into the bowl portion of the machine and toward the grinding gear in response to a force applied to the actuating handle 31. The length of lever arm 30 is made to restrict the downward displacement of the plunger 25 within the bowl portion to preclude contact with the grinding gear.

Means for withdrawing plunger 25 from the bowl portion of the machine upon release of handle 31 is provided by a spring 34 mounted by brackets 35 and 36, which are attached to the frame of shield 10 and actuating handle 31, respectively.

Attachment of the entire unit, illustrated in Figure 1, to the grinding machine is accomplished by means of bolts or studs 37 integrally secured to the frame member 11. Figure 2 shows a conventional rotary grinding machine 40 with a bowl portion 41 and grinding portion or gear 42. Grinding machine 40 is mounted beneath a table 43, which has an opening therein through which the substance to be ground may be placed into the bowl 41, and the complete unit shown in Figure 1 and comprising the shield 10, plunger 25, and actuating means 27 is installed and held in its desired position with respect to the bowl portion 41 of the machine by the studs 37 which extend through holes in table 43 and which may be secured by means of thumb screws (not shown).

In operation, with the unit installed in its proper position as shown in Figure 3 and with plunger 25 in its raised position, the substance to be ground is raked through the open end of shield 10 from table 43 and into the bowl portion 41 of machine 40. With the substance resting in the bowl 41, the actuating handle 31 is then forced downward. As described in detail hereinbefore, lever arms 28 and 29 are fixedly attached to the actuating handle 31 and are thereby rotated downwardly by the force applied to the handle. Being pivotably connected with plunger 25, lever arms 28 and 29 in turn impart downward vertical movement to plunger 25, which forces the substance to be ground into the grinding gear 42. As plunger 25 advances toward the grinding gear by the continued rotation of handle 31, spring 34 is being extended and lever arm 30 is being rotated downwardly until it reaches a position that restricts further downward movement of the plunger. Lever arm 30 is so designed that at this position the plunger just clears grinding gear 42 and substantially all of the material to be ground has been forced through the machine. Upon releasing the handle 31, spring 34 withdraws plunger 25 from the bowl portion of the machine and returns it to its raised position whereupon the cycle may then be repeated.

In performing the aforedescribed operation, it has been found that the material to be ground could be raked through the open end of shield 10 and into the bowl portion by the operator with the right hand until the bowl is adequately filled, and then with his left hand actuate the handle 31 and thereby force the material into the grinding portion of the machine. During the time the grinding operation is being performed, the operator, with his right hand, is gathering together the material which will form the next load for the machine. Thus, it may be seen that the present invention increases the productivity of conventional grinding machines with a minimum of effort on the part of the operator and at the same time eliminates the dangers and hazards inherent in present grinding machines since at all times the operator's hands are shielded from the grinding gear of the machine. Furthermore, the present invention has effectively eliminated the danger of contamination of the ground product by splinters or shearings from the plunger that heretofore so often came into contact with the grinding gear. In addition the entire assembly may be removed as a unit and cleaned by simply removing the thumb screws and lifting the unit off.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. An article of manufacture for use with a grinding machine having a bowl portion into which the substance to be ground is fed to the grinding portion of said machine, said article comprising a dome-shaped shield arranged to cover the bowl portion of said machine, said shield having an opening therein to provide limited access to said bowl portion, attachment means for securing said shield to said machine, a plunger pivotably supported within said shield, actuating means carried by said shield for moving said plunger into said bowl portion, said actuating means including a rotatable actuating member, lever arms carried by said actuating member and pivotably connected with said plunger for forcing said plunger into said bowl portion in response to rotation of said actuating member, and resilient means for automatically withdrawing said plunger from said bowl portion upon release of said actuating member.

2. An article of manufacture for use with rotary grinding machines having a bowl portion into which the substance to be ground is deposited, said article comprising a shield adapted to cover the bowl portion of said grind machine, said shield comprising a frame including a first U-shaped member, the spacing between legs of said member being substantially equal to the diameter of said bowl portion, a second U-shaped member, the legs of said second member being angularly attached to the legs of said first member, and a connecting member supported between said frame members, and cover means supported by said frame to form a dome-shaped shield for restricting access to said bowl portion, a plunger positioned within said shield, and actuating means fixedly supported by said shield and connected with said plunger for moving said plunger a predetermined distance into said bowl portion, said actuating means including a rotatable actuating member arranged for manual operation and lever arms carried by said actuating member and pivotably connected with said plunger for forcing said plunger into said bowl portion in response to rotation of said actuating member.

3. In combination with a grinding machine supported by a table and having a bowl portion into which the substance to be ground is fed through an opening in said table to the grinding portion of said machine, a plunger, mechanical means supporting said plunger to provide a partial cover for said opening and said bowl and for directing said plunger into said bowl and preventing contact with said grinding portion, shielding means supported by said table and covering said opening and said bowl portion, said shielding means having an opening through which the substance to be ground is deposited in said bowl portion, and means operatively connected with said mechanical means for moving said plunger into said bowl portion.

4. In combination with a grinding machine having a bowl portion into which the substance to be ground is fed to the grinding portion of said machine, a plunger pivotably supported above said bowl portion and arranged for translational movement into said bowl portion toward said grinding portion, a dome-shaped shield covering said bowl portion and having an opening through which the substance to be ground is applied to said machine, and actuating means carried by said shield and connected with said plunger for moving said plunger and thereby forcing the substance to be ground into said grinding portion.

5. For use with a grinding machine attached beneath a surface of a table and having a bowl portion positioned adjacent an opening in the table into which the substance to be ground is fed to the grinding portion of said machine, a plunger pivotably supported above said bowl portion and positioned for translational movement into said bowl portion, a dome-shaped shield covering said bowl portion and having an opening through which the substance to be ground is applied to said machine, said shield opening being continuous to the top surface of said table whereby the substance to be ground is moved without obstruction along the top surface of said table and into said bowl portion, and actuating means for moving said plunger into said bowl portion and thereby forcing the substance to be ground into said grinding portion, said actuating means including an actuating member arranged for manual rotation and a lever system carried by said actuating member and pivotably connected with said plunger for providing movement thereto into said bowl portion in response to rotation of said actuating member.

6. In combination with a grinding machine having a bowl portion into which the substance to be ground is fed to the grinding portion of said machine, a dome-shaped shield covering said bowl portion and having an opening through which the substance to be ground is applied to said machine, a plunger positioned within said shield above said bowl portion, and actuating means fixedly supported by said shield for moving said plunger a predetermined distance into said bowl portion, said actuating means including a rotatable actuating member arranged for manual operation and lever arms carried by said actuating member and pivotably connected with said plunger for forcing said plunger into said bowl portion in response to rotation of said actuating member.

7. In combination with a grinding machine having a bowl portion into which the substance to be ground is fed to the grinding portion of said machine, a dome-shaped shield covering said bowl portion and having an opening through which the substance to be ground is applied to said machine, a plunger positioned within said shield above said bowl portion, and actuating means fixedly supported by said shield for moving said plunger a predetermined distance into said bowl portion, said actuating means including a rotatable actuating member, lever arms carried by said actuating member and pivotably connected with said plunger for forcing said plunger into said bowl portion in response to rotation of said actuating member, and resilient means for automatically withdrawing said plunger from said bowl portion upon release of said actuating member.

References Cited in the file of this patent

UNITED STATES PATENTS

| 1,246,193 | Wolforsdorf | Nov. 13, 1917 |
| 1,533,217 | Steiner | Apr. 14, 1925 |
| 1,595,835 | Gundlach | Aug. 10, 1926 |
| 1,595,836 | Gundlach | Aug. 10, 1926 |